United States Patent
Wolanski

[11] Patent Number: 5,511,822
[45] Date of Patent: Apr. 30, 1996

[54] MOTORCYCLE TANK PAD APPARATUS AND METHODS

[76] Inventor: Daniel B. Wolanski, 13914 - 54th Ave., SE., Everett, Wash. 98208

[21] Appl. No.: 141,249

[22] Filed: Oct. 22, 1993

[51] Int. Cl.⁶ .................................................. B60R 13/04
[52] U.S. Cl. ...................... 280/770; 150/167; 280/288.4; 428/900
[58] Field of Search .................................. 280/830, 832, 280/833, 835, 770, 762, 288.4; 180/219; 296/152, 207, 136; 428/900, 928; 264/234, 345, 259, 265; 150/166, 167

[56] References Cited

U.S. PATENT DOCUMENTS

| | | | |
|---|---|---|---|
| 2,957,261 | 10/1960 | Moskowitz | 40/129 |
| 4,663,874 | 5/1987 | Sano et al. | 40/621 |
| 4,673,102 | 6/1987 | Bullock, Jr. | 220/457 |
| 4,849,272 | 7/1989 | Haney et al. | 280/770 |
| 4,884,824 | 12/1989 | Radke | 280/770 |
| 4,909,559 | 3/1990 | Zettle | 280/770 |
| 4,918,848 | 4/1990 | Stein | 40/584 |
| 5,107,949 | 4/1992 | Gotoh et al. | 180/219 |
| 5,158,324 | 10/1992 | Flesher | 280/770 |
| 5,180,190 | 1/1993 | Kersey et al. | 280/838 |
| 5,188,407 | 2/1993 | Villaveces et al. | 280/770 |

FOREIGN PATENT DOCUMENTS 0077383  3/1990  Japan ..................................... 280/835

OTHER PUBLICATIONS

Lockhart Racing Phillips U.S.A. 1993 Catalog, cover page and pp. 16, 17, 20, 21, 28, 29, and additional page (number unknown).
Miscellaneous advertisement illustrating "Napoleon Tank Pad (1–2–3)", p. 41.

Primary Examiner—Anne Marie Boehler
Attorney, Agent, or Firm—Vance & Romero

[57] ABSTRACT

This invention comprises apparatus and methods for extending the useful life of paint on a motorcycle by removably securing a tank pad, bra, and/or skin that is manufactured from a magnetic sheet material, to a metallic motorcycle gas tank and thereby protect the paint from abrasion and destructive elements.

7 Claims, 2 Drawing Sheets

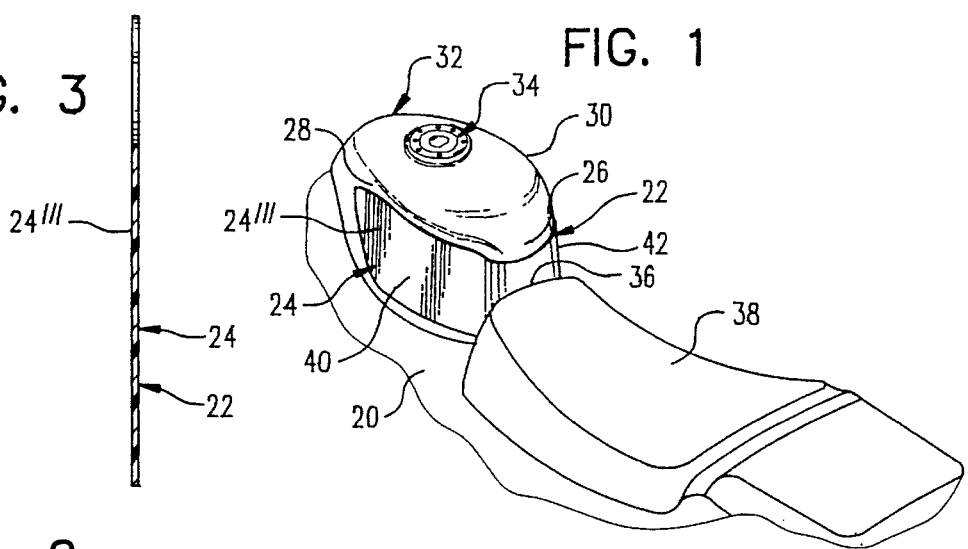
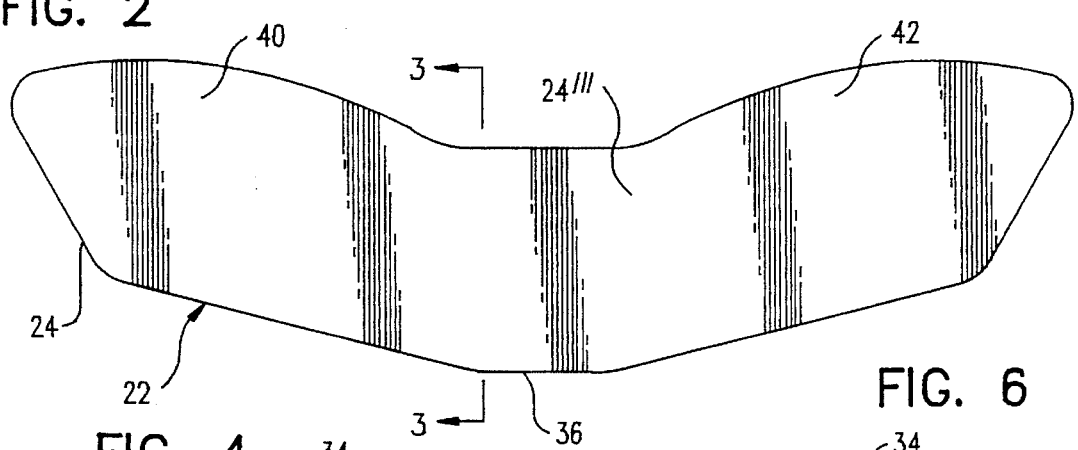
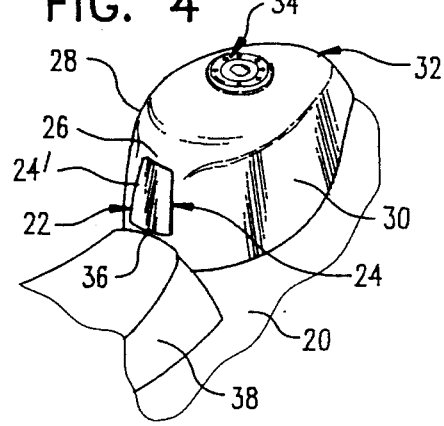
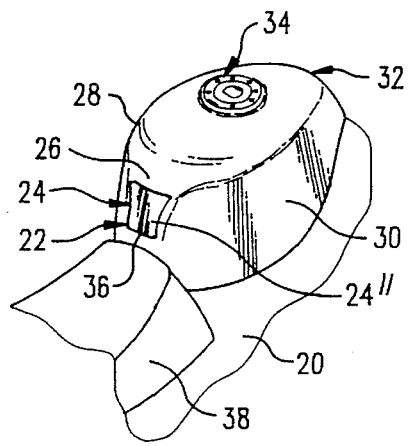
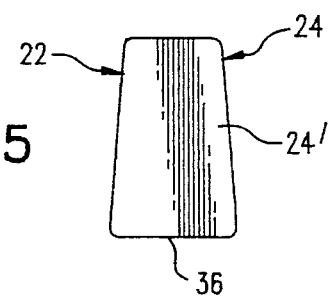
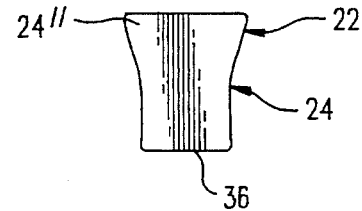

MOTORCYCLE TANK PAD APPARATUS AND METHODS

TECHNICAL FIELD

The present invention relates to motorcycle tank pad apparatus and methods; and, more particularly, to apparatus and methods for protecting painted exterior surfaces of a motorcycle gas tank against abrasion and destructive elements, and for removably holding and securing the protective pad or bra against the gas tank without necessarily requiring disassembly, modification, alteration, mutilation, defacement, or destruction of any part of the motorcycle.

BACKGROUND ART

Most modern motorcycles are engineered to have sleek, aerodynamic designs and appearance. Such designs are not only intended to reduce wind drag but, most importantly, are intended to enhance the aesthetic appeal of the vehicle to consumers. It is also commonly recognized that motorcyclists are attracted to particular paint colors and combination of colors. Partially due to the often exorbitant cost of such vehicles, motorcyclists are generally very protective of the paint finish on their motorcycles. Although many painted components on a motorcycle are now being manufactured using various types of resilient plastics, many of the more expensive vehicles still have metal gas tanks.

The paint finish on a motorcycle gas tank is especially important. Once the vehicle is mounted, the gas tank is positioned in plain view immediately between the legs of the cyclist. Some newer motorcycles are even designed with storage compartments incorporated into or attached to the housing of the gas tank, thereby elevating the exterior surfaces of the tank upward toward the stomach or chest of the rider.

The painted exterior surface of the gas tank is generally exposed to many different destructive forces. For example, an opening that allows for the insertion of fuel into the enclosure of the tank is usually provided within the uppermost portion of the tank. The nozzle of the fuel filling hose is almost exclusively made of a hard metal material that is inserted into the tank opening. At each refueling, there is always danger that the nozzle can impact against and damage the paint of the gas tank. Furthermore, fuel can be spilt onto the surrounding exterior surfaces of the tank during the refueling process, thus tarnishing or removing wax finishes that were previously applied to protect the tank.

Since the rider straddles the gas tank between his or her legs, abrasion between the legs and/or clothing of the rider and the tank can cause damage to the paint finish. In addition, due to the ever increasing height of the gas tank, with respect to the height of the seat, motorcycle gas tanks are becoming more exposed to damage from impacts with the pant belt buckle of the rider, thereby damaging the paint finish.

Inclement weather, such as storms, rain, sleet, snow, heat, wind, and dust, can damage the paint finish of a motorcycle. Vandalism is another cause of paint damage to motorcycles.

Numerous gas tank pads, bras, and skins have been invented to protect the exterior surfaces of a motorcycle, and thereby increase the longevity and continued value of the vehicle.

Many of such devices, however, are very complex and are difficult to manufacture, install, and maintain. Such devices nearly universally require the use of numerous gas tank specific attachment means. Such devices are commonly attached to the gas tank and held in place by use of Teflon hooks, special felt covered steel hooks, custom hooks and fasteners, and/or shock cords that contact and engage various parts of the motorcycle. Other means for attachment directly to the vehicle may comprise use of holes, brackets, rivets, screws, bolts, pins, hooks, or permanent adhesive. As will be discussed further below, use of such complex securement means often requires modification, defacement, alteration, mutilation, and/or permanent destruction of at least a part of the motorcycle.

Each hook, fastener, and cord that is used increases the likelihood of further abrasion at each and every point of contact with the vehicle. Such devices are often difficult to mount to the vehicle because many different points of contact must be made simultaneously.

The seat of the motorcycle may even have to be removed to reach connection points located on the rearward most portions of the gas tank or motorcycle frame. This requires at least a partial disassembly of the motorcycle.

The motorcycle might also have to be modified to accommodate the placement of such hooks, fasteners, and cords. This may require alteration, and possibly, destruction, mutilation, and defacement of at least a portion of the original motorcycle.

The hooks, fasteners, and cords do not lie flat against the gas tank. Consequently, such elements may become juxtaposed between the body of the rider and the exterior surfaces of the gas tank. If pressure is applied to such elements, such as by the body of the rider, the painted surface of the tank may become scratched or the tank may even become permanently dented.

Alternatively, the gas tank pad, bra, or skin can be physically and permanently adhered directly to the exterior painted surface of the gas tank. Some devices are provided with an adhesive backing that can be easily applied to the gas tank to secure the device in place.

When the tank pad, bra, or skin is adhered directly to the painted surface of the gas tank, removal is usually impossible without partial or complete destruction of the pad, bra, skin, and/or gas tank. In other words, by using adhesives to secure the device to the gas tank, the device and often the fine, polished paint finish of the motorcycle may become altered, destroyed, mutilated, and/or defaced. More particularly, when the adhered device is removed from the exterior surface of the gas tank, the surface paint of the tank can become marred, pitted, faded, or torn away. Heretofore, defacement of the underlying gas tank and painted surface was likely.

Furthermore, an adhesive is used to permanently secure the device to the gas tank. Adhesives having less strength than to allow permanent securement would not be able to withstand the forces exerted against the device for which the device is being used. The gas tank would also become damaged by constant application and removal of an adhesively applied device. Residual adhesive and remains of earlier devices may even defy removal. When removed, the remains of the earlier devices and/or the adhesive will most likely have caused damage to the underlying gas tank and paint.

The gas tank pads, bras, and skins heretofore known were manufactured using: absorbent cotton backed vinyl; absorbent foam backed vinyl; permeable four-way-stretch fabric material; or extremely thin, clear vinyl or nylon.

With the possible exception of the clear vinyl or nylon, use of the other listed materials presents many dangers to the motorcycle and/or to its rider. For example, due to the close proximity of the tank pad, bra, or skin to the fill opening of the gas tank, such absorbent materials may become saturated in flammable fuel. At best, the fuel laden material will only rub up against the fine paint finish of the tank, possibly discoloring and damaging the finish. Since the pad, bra, or skin is intended to be positioned between the clothing of the rider and the tank, it can be expected that the fuel laden material will rub against and soil the clothing of the rider.

If the exterior surfaces of the metal gas tank are extremely hot or if an independent source of flame is introduced to the fuel laden material, a fire could result. Furthermore, if the clothing of the rider has absorbed any of the fuel, irrespective of whether the rider is still on the vehicle or not, such clothing can ignite and thereby expose the rider to severe physical danger.

The devices heretofore known have been very expensive to both manufacture and purchase. Such expense is understandable given the extensive manufacturing process that is required. The cover material, padded backing, piping, labels, straps, hooks, fasteners, and cords must be manufactured or purchased. The cover material, padded backing, and piping must be cut to appropriate sizes and in numerous different shapes. The variously shaped cover material must be sewn together to form a contoured cover. The piping or edging must be sewn about the edges of the cover. The labels must be sewn to the cover. The underlying absorbent padding or backing must be either sewn or adhered to the cover fabric. The straps, hooks, fasteners, and cords must be sewn to the cover fabric. Instruction materials explaining how the device is attached to the vehicle must be printed and included. The device must be packaged and then distributed to the public.

After all of this has occurred, the created device can only be applied to a single configuration of gas tank. A new product design or pattern must be used for each differently configured gas tank.

It is extremely expensive, inconvenient, and time-consuming to manufacture, store, and retrieve tank pads, bras, and skins that can fit the many different tank configurations that are produced by the many different motorcycle manufacturers.

Due to the expensive nature of such devices, a further problem is that of theft. If the device is easy to apply, the device may also be easily removed. The danger of theft makes such devices less attractive to consumers.

The inventor believes that the above-identified devices taken alone or in combination neither anticipate nor render obvious the present invention. These citations do not constitute an admission that such devices are relevant or material to the present claims. Rather, these citations relate only to the general field of the disclosure and are cited as constituting the closest art of which the inventor is aware.

DISCLOSURE OF INVENTION

It is the general object of the present invention to provide apparatus and methods for maintaining the positive appearance and extending the useful life of a motorcycle gas tank by protecting the painted exterior surfaces thereof against: impact with the belt buckle of the rider; abrasion with the clothing, and inner thigh and legs of the rider; and destructive elements, such as fuel spillage and inclement weather, including storms, rain, sleet, snow, heat, wind, and dust, that can damage the paint finish of a motorcycle.

A further object of the present invention is to provide apparatus and methods for removably holding and securing a protective pad, bra, and/or skin against a metallic motorcycle gas tank, whereby the apparatus may be quickly and easily removed from or replaced upon the tank without interfering with the otherwise normal operation of the motorcycle.

Another object is to provide apparatus that can be removably held and secured to the motorcycle gas tank without requiring disassembly, permanent treatment, modification, defacement, alteration, mutilation, or destruction of the apparatus, paint, or any part of the motorcycle.

Another object is to provide apparatus, in the form of protective pads, bras, and/or skins, that do not require use of hooks, fasteners, shock cords, brackets, rivets, screws, bolts, pins, or adhesive to secure the apparatus to the exterior sides of a motorcycle gas tank.

Another object is to provide apparatus that is capable of being contoured or remolded to fit a wide variety of differently sized and dimensioned metal motorcycle gas tanks.

Another object is to provide apparatus that is sleek, enhances the aesthetic appeal of the vehicle, lies flat against and is contoured to the exterior surface of the gas tank, is available in a wide variety of colors to match or complement the colors of the vehicle, and does not detract from the aerodynamic design or appearance of the motorcycle.

Another object is to provide apparatus that can be as simple as a single, compact, removable, flexible, remoldable, rugged, durable, nonabsorbent, magnetically secured, easily constructed apparatus that is inexpensive and economical to manufacture, install, and maintain.

Another object is to provide apparatus that is easily manipulated and extremely simple to apply and remove, without requiring any careful or critical attention by an installer to placement of the apparatus on the gas tank.

Another object is to provide apparatus wherein at least one side of the protective pad, bra, and/or skin has a surface upon which trademarks and/or advertising indicia may be applied or printed.

Another object is to provide apparatus that is so inexpensive to manufacture and purchase that theft of the apparatus is unlikely and of minor financial impact if theft were to occur.

The present invention has been specifically engineered for aesthetic appeal, unique and distinctive design, and effective functionality. The apparatus may be quickly and easily installed without requiring use of any particular skills or tools. The dramatically increased protection for the paint on the gas tank, without the fear of harming the tank or absorbing fuel, is of particular benefit. The present invention not only simplifies the apparatus needed to protect the gas tank, it also provides an inexpensive, unobtrusive, disposable apparatus that maximizes ease in placing trademarks and other advertizing indicia in a very prominent location on the motorcycle and removing such indicia therefrom without damaging the motorcycle.

The present invention achieves these general and specific objects and presents new apparatus and methods for protecting and shielding paint of a metallic gas tank of a motorcycle. The present invention also overcomes all of the previously mentioned disadvantages.

To achieve these objects the present invention comprises a pad, bra, or skin of resilient, flexible sheet material, and means for removably and magnetically securing the pad to the gas tank. As used herein, and especially within the Claims, the term "pad" refers to one or more protective pads, bras, and/or skins.

It is important to note that the securing means uses magnetics and frictional contact between the pad and the gas tank to restrict movement of the pad. There is no requirement to disassemble or modify the motorcycle to install or remove the pad.

In addition, the flexible pad is capable of being remolded to conform to the contour of the gas tank. To accomplish this remolding, the pad is heated, placed upon or juxtaposed about the gas tank in its heated state, and allowed to cool. After placement of the heated pad and during the cooling process, the pad is magnetically secured to the gas tank. The magnetism between the pad and the gas tank assures that there is a tight, nearly seamless fit between these two elements. Once the pad has cooled, the pad generally assumes a configuration that conforms to the contour of the gas tank.

In the preferred embodiment of the invention, the aforementioned securing means is integrally formed within the pad. For example, the pad may comprise a sheet of magnetic material having a thickness of about 1/64 to 1 inch.

In other words, the invention can be defined as a removable, flexible pad of sheet material having magnetic characteristics. Of course, the pad is capable of being juxtaposed against the gas tank and is magnetically secured to the gas tank. The pad is also capable of being remolded when heated and allowed to cool, to generally assume a conforming contour of the gas tank.

Indicia such as the trademark of the product, and/or advertising indicia can be applied to or printed upon an exterior surface of the pad. The exterior surface of the pad is positioned away from the gas tank.

Similarly, indicia containing instructions for use of the invention can be applied to or printed upon an interior surface of the pad. The interior surface of the pad is positioned toward the gas tank.

The pad may take any desirable shape. For example, in one embodiment, the pad may have a generally planar trapezoidal shape or configuration. In another embodiment, the pad may have a generally planar concavo-concave shape or configuration. In a further embodiment, the pad may have a generally planar hourglass shape or configuration. The pad may even be enlarged or elongated to have a generally planar wing-shaped or fan-shaped configuration that covers and protects not only a portion of the rearward most surface of the gas tank but also a portion of the adjacent sides of the gas tank.

The methods or processes used in the present invention to protect and shield the paint of the metallic gas tank of the motorcycle include the steps of:

(a) cutting the pad of resilient, flexible, magnetic sheet material to a desired shape;

(b) heating the pad until the pad becomes at least partially remoldable;

(c) juxtaposing the heated pad in a desired location against the gas tank so that magnetic forces within the sheet material pull the pad against the metallic gas tank;

(d) smoothing out the heated pad that is magnetically secured to the gas tank to remove air pockets from therebetween;

(e) allowing the heated pad to conform to the contour of the gas tank; and (f) allowing the heated pad to cool and thereby retain the general contour of the gas tank.

Additional steps may include:

(g) applying or printing indicia upon the exterior surface of the pad; and/or (h) applying or printing instructions for use upon the interior surface of the pad.

The step of cutting the pad can be more particularly and restrictively described as cutting the pad into a generally:

(a) planar trapezoidal shape or configuration;

(b) planar concavo-concave shape or configuration;

(c) planar hourglass shape or configuration; and/or (d) planar wing-shaped or fan-shaped configuration that covers and protects at least a portion of the rearward most surface of the gas tank and at least a portion of the adjacent sides of the gas tank.

Of course, other configurations can be used and are encompassed within the appended Claims.

These and other objects and advantages of the present invention will become more readily apparent upon reading the following disclosure and referring to the attached drawings.

BRIEF DESCRIPTION OF DRAWINGS

FIG. 1 is an isometric view of a third embodiment of the claimed invention as taught herein, illustrating its attachment to a metallic gas tank of a motorcycle. FIG. 1 only illustrates the relevant portions of the motorcycle.

FIG. 2 is an enlarged, side-elevational view of the third embodiment illustrated in FIG. 1.

FIG. 3 is a cross-sectional, side-elevational view of the third embodiment illustrated in FIGS. 1 and 2, as viewed along a plane defined by line 3—3 in FIG. 2.

FIG. 4 is an isometric view of a first embodiment of the claimed invention being secured to a metallic gas tank of a motorcycle.

FIG. 5 is an enlarged, side-elevational view of the first embodiment illustrated in FIG. 4.

FIG. 6 is an isometric view of a second embodiment of the claimed invention being secured to a metallic gas tank of a motorcycle.

FIG. 7 is an enlarged, side-elevational view of the second embodiment illustrated in FIG. 6.

Figure 8:
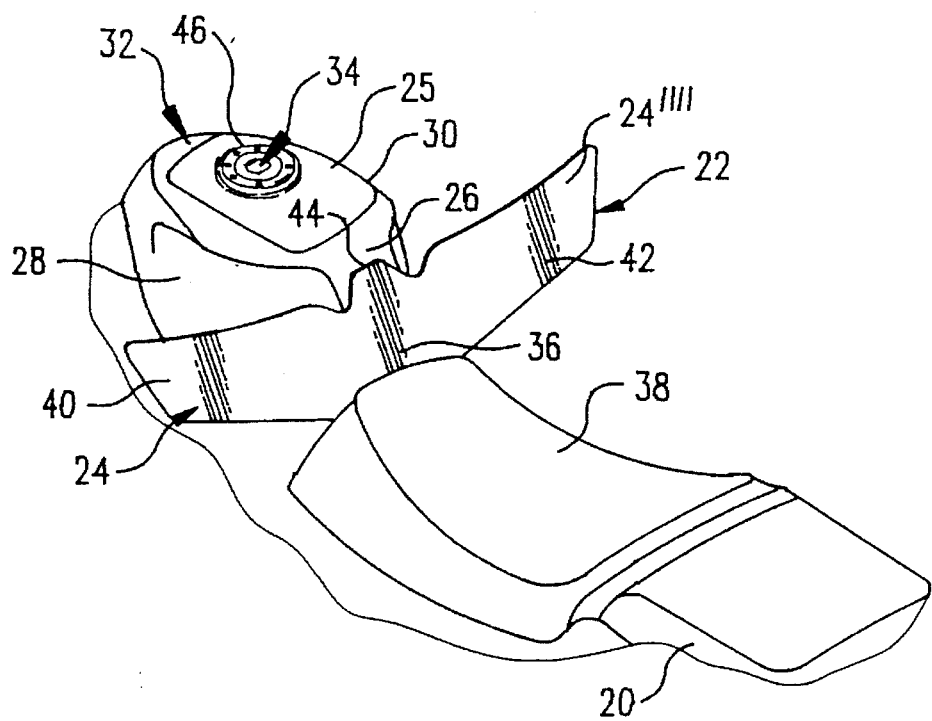
FIG. 8 is an isometric, schematic view of a fourth and fifth embodiment of the claimed invention being secured to a metallic gas tank of a motorcycle.

One should understand that the drawings are not necessarily to scale and the elements are sometimes illustrated by graphic symbols, phantom lines, diagrammatic representations, and fragmentary views. In certain instances, the inventor may have omitted details which are not necessary for an understanding of the present invention or which render other details difficult to perceive.

BEST MODE FOR CARRYING OUT THE INVENTION

Referring to the drawings and particularly to FIG. 1, wherein like numerals indicate like parts, the present invention is an accessory for a conventional motorcycle 20. More particularly, the present invention comprises apparatus 22 and methods for magnetically securing or attaching a protective pad 24, bra, or skin to an exterior surface of rearward portion 26 and possibly to adjacent side portions 28 and 30 of a metallic gas tank 32 of motorcycle 20. Preferably, tank 32 is manufactured from steel.

Use of pad 24 is primarily intended to protect the exterior paint of tank 32 against abrasion that commonly occurs between tank 32 and the legs and/or belt buckle of a rider (not shown).

In the preferred embodiment of the invention, pad 24 is manufactured from a sheet of magnetic material. The magnetic sheet material itself defines and functions as the protective pad 24 or bra. Such magnetic sheet material is relatively flat, flexible, resilient, nonabsorbent, is easily cleaned, and becomes more pliable or remoldable when heated.

It is not intended that pad 24 requires that an absorbent cotton or foam backing material be juxtaposed between pad 24 and tank 32. Nor is pad 24 manufactured from an easily permeated or absorbent material.

As explained above, the nonabsorbent feature of pad 24 is particularly important given the close proximity of pad 24 to the fill opening 34 of tank 32.

The magnetic sheet material of pad 24 can be cut or formed to enable its attachment to the curved surfaces of tank 32. Pad 24 may have any desired size and/or configuration.

The dimensions of pad 24 may be specifically designed to accommodate maximum or optimal magnetic adhesion, maximum or optimal coverage, and/or enhanced aesthetic appearance of the invention upon the back or rearward portion 26 and/or upon the adjacent side portions 28 and 30 of tank 32. For example, pad 24 may be configured to not only cover and protect rearward portion 26 but also to cover and protect much of side portions 28 and 30 that will be adjacent the legs of the rider. Pad 24 may also extend upwardly around tank 32 to protect tank 32 against contact with the pant belt buckle and/or jacket buttons and/or zippers of the rider.

FIGS. 1 through 7 more particularly illustrate three different embodiments of the invention.

FIGS. 4 and 5 illustrate a first embodiment of the invention, wherein pad 24' is relatively small in size relative to the size of tank 32. Pad 24' has a generally planar tapered trapezoidal shape or configuration. The size and configuration of pad 24' is particularly adapted to fit upon tanks 32 that have a relatively flat rearward portion 26. The trapezoidal shape of pad 24', however, does not always fit well upon curved surfaces of many motorcycle tanks.

Consequently, the second embodiment of the invention, as illustrated in FIGS. 6 and 7, was created. Pad 24" of the second embodiment is again relatively small in size relative to the size of tank 32. Pad 24" has a generally planar concavo-concave or hourglass shape or configuration that covers and protects rearward portion 26 of tank 32. The size and configuration of pad 24" is more appropriately adapted to form fit around curved surfaces of tank 32.

FIGS. 1, 2, and 3 illustrate a larger third embodiment of the invention, wherein pad 24''' covers, protects, and shields a significant portion of tank 32. More particularly, pad 24''' has a generally planar wing-shaped or fan-shaped configuration that covers and protects a significant portion of rearward portion 26 and of adjacent side portions 28 and 30 of tank 32.

Since pad 24''' is so large in relation to tank 32, it may be necessary to remold pad 24''' to more properly conform to the contours of tank 32. This remolding process may be accomplished by heating the magnetic sheet material prior to applying pad 24''' to tank 32.

In the preferred embodiment of the invention, pad 24''' is heated in a large convection oven Alternatively, pads 24', 24", and 24''' may be heated using a heat gun or even a hair blower or dryer. The heating of the magnetic sheet material makes the sheet material more pliable. In its heated state, the magnetic sheet material is placed into its proper position against the tank 32 and is allowed to mold itself to the shape or contour of tank 32. The internal magnetic forces that are inherent within the magnetic sheet material urge the heated pad 24''' to assume a tight, molded configuration about tank 32. The magnetic sheet material is then allowed to cool to form pad 24''' that has a custom fit about a specific style of motorcycle gas tank 32.

Please note that if remolded, pads 24', 24", and 24''' are preheated before being applied to the tank 32. The inventor suggests strongly that pad 24 be not heated while attached to tank 32. For safety, the inventor suggests that the source of heat be kept approximately twenty-five feet (25') away from tank 32. The counsel is particularly important since gasoline fumes may ignite.

Prior to installation, tank 32 should be washed and waxed. This removes any debris from the work surface that could otherwise become transferred to the remolded pad 24. The installer should ensure that tank 32 is dirt free before applying the heated pad 24.

The back side or interior surface of pad 24 that will be juxtaposed against tank 32 should also be wiped with a damp cloth to remove any dirt or debris and then be allowed to dry.

Placing pad 24 and motorcycle 20 in the sun, prior to application, to gently warm both pad 24 and tank 32 greatly aids in the installation process.

The inventor has found it advantageous to place pad 24 upon a flat sheet of cardboard during the heating process. In this manner, any expensive underlying support structure will not be damaged during the heating process.

The inventor also prefers to direct the heat towards the back or interior surface of pad 24 that will subsequently be juxtaposed directly against tank 32. By doing so, if pad 24 becomes over-heated, the printed trademark, advertisement indicia, and upper, finish surface of pad 24 will not become damaged.

If a conventional hair dryer having a heat setting thereon is used, heat should be applied for about one minute. The installer should be careful not to melt or severely shrink pad 24 during the heating process.

Once pad 24 is heated, it is immediately applied or attached to tank 32 at a location where the installer wishes to either prevent or coverup scratches and damage to the paint of tank 32. Unless the installer is particularly fastidious, there is little or no need for careful or critical attention to the placement of pad 24 upon tank 32.

The bottom or lowermost portion 36 of pad 24 that is attached to rearward portion 26 of tank 32 may be partially tucked or inserted down between tank 32 and seat 38 of motorcycle 20. Such insertion gives pad 24 a sleek "built-in" appearance.

To install pad 24''' the side wings 40 and 42 are wrapped around the adjacent side portions 28 and 30 of tank 32. Pad 24''' should be positioned so that the key features of the invention mate with corresponding or matching features on tank 32.

If pad 24 needs to be adjusted slightly, side wings 40 and 42 can be peeled back, as illustrated in FIG. 8, and pad 24 can be reapplied.

Figure 9:
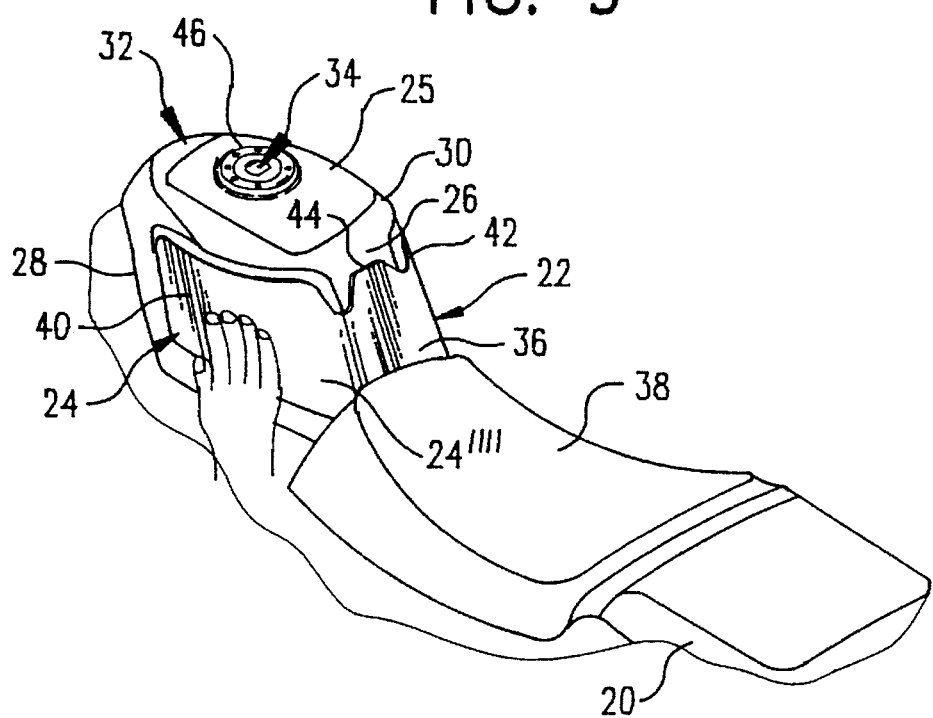
FIG. 9 is an isometric, schematic view of the fourth and fifth embodiment illustrated in FIG. 8, wherein the pad is applied to the tank.

FIGS. 8 and 9 illustrate a fourth and fifth embodiment of the invention. The fourth embodiment comprises a slightly differently configured or shaped pad 24'''' as compared to pad 24''''. Please note that pad 24'''' includes a third wing or upwardly extending flange or protrusion 44 that further covers and protects rearward portion 26 of tank 32.

The fifth embodiment comprises a generally large pad 25 that is place on top of tank 32 such that pad 25 surrounds fill opening 34. An aperture 46 or opening is provided within pad 25 to allow access to fill opening 34.

As illustrated in FIG. 9, once pad 24 is applied, the installer should then press down on all corners of pad 24 and work out any bubbles from between pad 24 and tank 32. Any bubbles or air pockets that are formed between tank 32 and pad 24 can be gently smoothed out with a rag or the hand of the installer. Thus treated, pad 24 assumes a customized configuration conforming to the contour of tank 32.

Pad 24 is allowed to cool while applied to tank 32. Once cooled, pad 24 assumes a "memory" configuration. In other words, pad 24 will retain its shape even after removal from tank 32.

If the installer finds it necessary to change the "memory" or configuration of pad 24, the above-described process is repeated.

Once applied to tank 32 using the process described above, pad 24 becomes wind proof. In other words, pad 24 will remain within its original position during normal operation of motorcycle 20 and will not "catch wind" and fly off. Unless removed, pad 24 will not slip out of its original position.

In fact, the above-mentioned process creates a vacuum between pad 24 and tank 32, in addition to the magnetic attraction between such elements. The tight seal so generated prevents air, dirt, debris, fuel, and water from collecting between pad 24 and tank 32.

These features and characteristics are in stark contrast to fabric tank covers referred to above. Pad 24 of the present invention will far outlast such other fabric tank covers that quickly stretch, fade, and fail. In addition, pad 24 can be easily applied in just a few minutes without having to deal with the time-consuming hassle of attaching straps, buckles, and metal clasps as heretofore thought necessary.

The thickness of pad 24 is dependent upon the thickness of the sheet of magnetic material from which pad 24 is cut. Consequently, pad 24 may be relatively thin and unobstructive or, if desired, thicker to give greater protection.

The aforementioned process allows the invention to be removable without leaving behind any residue. Pad 24 is also adjustable, waterproof, and nonabsorbent.

If desired, pad 24 can be trimmed with a pair of scissors (not shown) to fit upon a narrow tank 32.

Pad 24 may also be used to coverup and hide prior damage to tank 32.

Pad 24 may be printed or manufactured in any desirable color. A large assortment of colors and styles can be used.

Another significant benefit of manufacturing pad 24 from a flexible, magnetic sheet material is that such material provides a wonderful surface upon which trademarks, and/or other advertisement indicia can be printed or placed. For example, if silk screening is used, the resulting graphics can be extremely clear and crisp in comparison to similar printing upon textured fabric.

Pad 24 may be cleaned with the same detergent that is used to wash motorcycle 20.

The means and construction disclosed herein are by way of example and comprise primarily the preferred form of putting the invention into effect. Although the drawings depict preferred and alternative embodiments of the invention, other embodiments have been described within the preceding text. One skilled in the art will appreciate that the disclosed device could have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments which fall within the legitimate and valid scope of the appended claims, appropriately interpreted under the Doctrine of Equivalents.

INDUSTRIAL APPLICABILITY

This invention may be used to selectively protect the paint of motorcycle gas tanks from abrasion and destructive forces. The invention generally comprises apparatus and means for removably holding and securing a protective pad, bra, or skin against the exterior surfaces of a metallic motorcycle gas tank without requiring disassembly, modification, alteration, mutilation, defacement, or destruction either of the protective apparatus or of any part of the motorcycle. An additional, specially-designed, independent means for securement is not necessary or required. The invention is manufactured from a magnetic element or material. The magnetic element enables the invention to be secured to any metallic motorcycle gas tank without marring or defacing the tank. Holes, brackets, rivets, screws, bolts, pins, hooks, and adhesive are not required nor needed. When placed against the metal tank, a magnetic connection is formed between the invention and the tank, thus holding the invention in place against the tank. The invention can be magnetically secured to the tank in any desired location and thereby protect the tank against abrasion and ravages of inclement weather. When desired, the invention may be simply and easily removed and replaced without incurring damage to either the invention or to the tank. This invention is very durable in design, is easily constructed, inexpensive and economical to manufacture, and is extremely simple to use.

I claim:

1. A method of protecting and shielding paint of a metallic gas tank of a motorcycle comprising the steps of:
    (a) cutting a pad of resilient, flexible, magnetic sheet material to a desired shape;
    (b) heating the pad until the pad becomes at least partially remoldable;
    (c) juxtaposing the heated pad in a desired location against the gas tank so that magnetic forces within the sheet material pull the pad against the metallic gas tank;
    (d) smoothing out the heated pad that is magnetically secured to the gas tank to remove air pockets from therebetween;
    (e) allowing the heated pad to conform to the contour of the gas tank; and
    (f) allowing the heated pad to cool and thereby retain the general contour of the gas tank.

2. The method of claim 1, further comprising the step of applying or printing indicia upon an exterior surface of the pad.

3. The method of claim 1, further comprising the step of applying or printing instructions for use upon an interior surface of the pad.

4. The method of claim 1, wherein said step of cutting the pad further comprises the step of cutting the pad into a generally planar trapezoidal shape.

5. The method of claim 1, wherein said step of cutting the pad further comprises the step of cutting the pad into a generally planar concavo-concave shape.

6. The method of claim 1, Wherein said step of cutting the pad further comprises the step of cutting the pad into a generally planar hourglass shape.

7. The method of claim 1, wherein said step of cutting the pad further comprises the step of cutting the pad into a generally planar wing-shaped configuration that covers and protects at least a portion of a rearward most surface of the gas tank and at least a portion of adjacent sides of the gas tank.

* * * * *